United States Patent

Angner et al.

[15] 3,651,274

[45] Mar. 21, 1972

[54] SELECTIVE SIGNALING SYSTEM

[72] Inventors: Ronald Joseph Angner, Freehold; Anthony Koscinski, Brick Town, both of N.J.

[73] Assignee: Bell Telephone Laboratories, Incorporated, Murray Hill, N.J.

[22] Filed: Oct. 5, 1970

[21] Appl. No.: 78,053

[52] U.S. Cl. ....................................179/19, 179/30, 178/38

[51] Int. Cl. ....................................................H04m 3/16

[58] Field of Search ..................179/30, 38, 18 FC, 17 B, 19, 179/18 D, 18 DA

[56] References Cited

UNITED STATES PATENTS

| | | | |
|---|---|---|---|
| 2,221,655 | 11/1940 | Schiffmann | 179/17 B |
| 2,395,798 | 3/1946 | Baumfalk | 179/19 |

*Primary Examiner*—Ralph D. Blakeslee
*Attorney*—R. J. Guenther and James Warren Falk

[57] ABSTRACT

A multilocation private line selective signaling system is arranged to generate privacy lockout tones when a first station at any location goes off-hook. The first such off-hook station is designated a controlling station and circuitry at each location responds to the lockout tones by removing signaling and communicating capability from all but the controlling station. Communication capability is extended only to those stations signaled by the controlling station and busy tone is returned to any off-hook station which has not been given such capability. Each location is arranged with circuitry for controlling data transmission between stations and for preventing any station from interfering with the data.

24 Claims, 9 Drawing Figures

INVENTORS R. J. ANGNER
A. KOSCINSKI

BY [signature]

ATTORNEY

PATENTED MAR 21 1972

3,651,274

SELECTIVE SIGNALING SYSTEM

BACKGROUND OF THE INVENTION

This invention relates to private line right-of-way signaling systems and more particularly to an arrangement for providing private communications between selected stations served by a primate line facility.

DESCRIPTION OF THE PRIOR ART

The arrangement of a single private communication line between a number of separate locations with many stations at each location having access to the line is a well-known method for providing instant communication between specific points. Such an arrangement is especially important for executives or government officials, such as mayors or governors, who must have immediate access to a number of stations. Selective signaling systems also find wide usage is right-of-way communications where dispatchers, such as railroad dispatchers, must communicate with certain stations or with groups of stations at different points along a pipeline or railroad main line.

Such selective signaling systems must be designed to meet two basic requirements, each requirement being of paramount importance in certain situations. On the one hand, when the system is serving dispatch functions it is critical that a dispatcher at any station have immediate access to any other station for emergency purposes even when the private line facility interconnecting the stations is busy. On the other hand, because communication over the system may be of a sensitive nature it is equally important that all connections between stations remain private and that a party not involved in the connection be excluded therefrom.

Numerous attempts in the past have been made to satisfy these requirements. One such arrangement is disclosed in the M. R. Winkler U.S. Pat. No. 2,626,384. The Winkler patent teaches an automatic lockout system with automatic releasing features. In Winkler, dialing capability of any locked-out station is removed from the line by completely isolating the transmission leads. Under the Winkler arrangement is locked-out station cannot be called until the system is released. In other systems arranged with privacy features, any station equipped with an override key may void the privacy feature and unlock the entire system thus gaining access to communications which the communicating parties believe to be private.

A further limitation of prior art selective signaling systems is that no provision is made to protect data communication between stations from becoming garbled due to extraneous signals generated by unconnected stations or by inadvertent signaling from the connected stations.

Accordingly, a need exists in the art for a private line selective signaling system capable of maintaining communication between a calling station and any number of called stations private while the system remains viable to handle communication from any other station.

A further need exists for a private line switching system capable of handling data transmission between stations without interference from the communicating stations or from other stations connected to the private line facility.

SUMMARY OF THE INVENTION

These and other objects are obtained in accordance with one exemplary embodiment of the invention wherein a four-wire private line facility is arranged for interconnecting a number of locations each location serving a number of stations. Each of the stations is selectively accessible from any other station by the transmission of a three-digit code number from the calling station. The transmitted digits are decoded by common receiver and decoding circuitry at each location and the station or stations corresponding to the transmitted code are activated.

When a first station goes off-hook a privacy lockout tone is transmitted throughout the system. The first such station off-hook is designated a controlling or originating station and circuitry at each location responds to the lockout tones by removing signaling and communicating capability from all but the controlling station. Communication capability is extended only to those stations dialed by the controlling station and busy tone is returned to any off-hook station which has not been given such capability. Signaling between the stations is discreet in that subscribers at stations which have not been signaled are not made aware that there is a call currently in progress.

Stations which are equipped for priority calling are arranged with a nonlocking key the operation of which causes a subdued tone to be transmitted throughout the system as a warning to the communicating parties that a station which has not been dialed by the controlling station is attempting to use the facility. Operation of the priority key also provides the priority station with transmission capability so that the privacy overriding station may audibly inform the parties currently on the line that a priority call is necessary. If the priority warrants pre-emption the system is cleared by the originally designated controlling station going on-hook.

When data is to be transmitted, a special data code is transmitted from the controlling station throughout the system and all signal generating equipment together with all dialing capabilities are removed from all stations in the system. During data transmission periods busy tone is not transmitted to stations which go off-hook. Instead, and off-hook station's receiver is activated so that the signals representative of the data transmission can be audibly observed by the off-hook subscriber. This audible signal is utilized instead of the normal busy tone thus avoiding extraneous signals which could interfere with data transmission. When the system is in the data mode, any absence of data communication will cause the system to revert to the normal mode of operation.

DESCRIPTION OF THE DRAWING

The foregoing objects, features and advantages, as well as others of the invention, will be more apparent from the following description of the drawing, in which.

It will be noted that FIGS. 2 through 6 employ a type of notation referred to as "detached contact" in which an "X" shown intersecting a conductor represents a normally open contact of a relay and a bar shown intersecting a conductor at right angles represents a normally closed contact of a relay, "-normally" referring to the unoperated condition of the relay. The principles of this type of notation are described in an article entitled "An Improved Detached Contact Type Schematic Circuit Drawing" by F. T. Meyer in the Sept. 1955 publication, *Transactions of The American Institute of The Electrical Engineers*, Part 1, *Communications and Electronics*, Vol. 74, pages 505–513.

Figure 2:
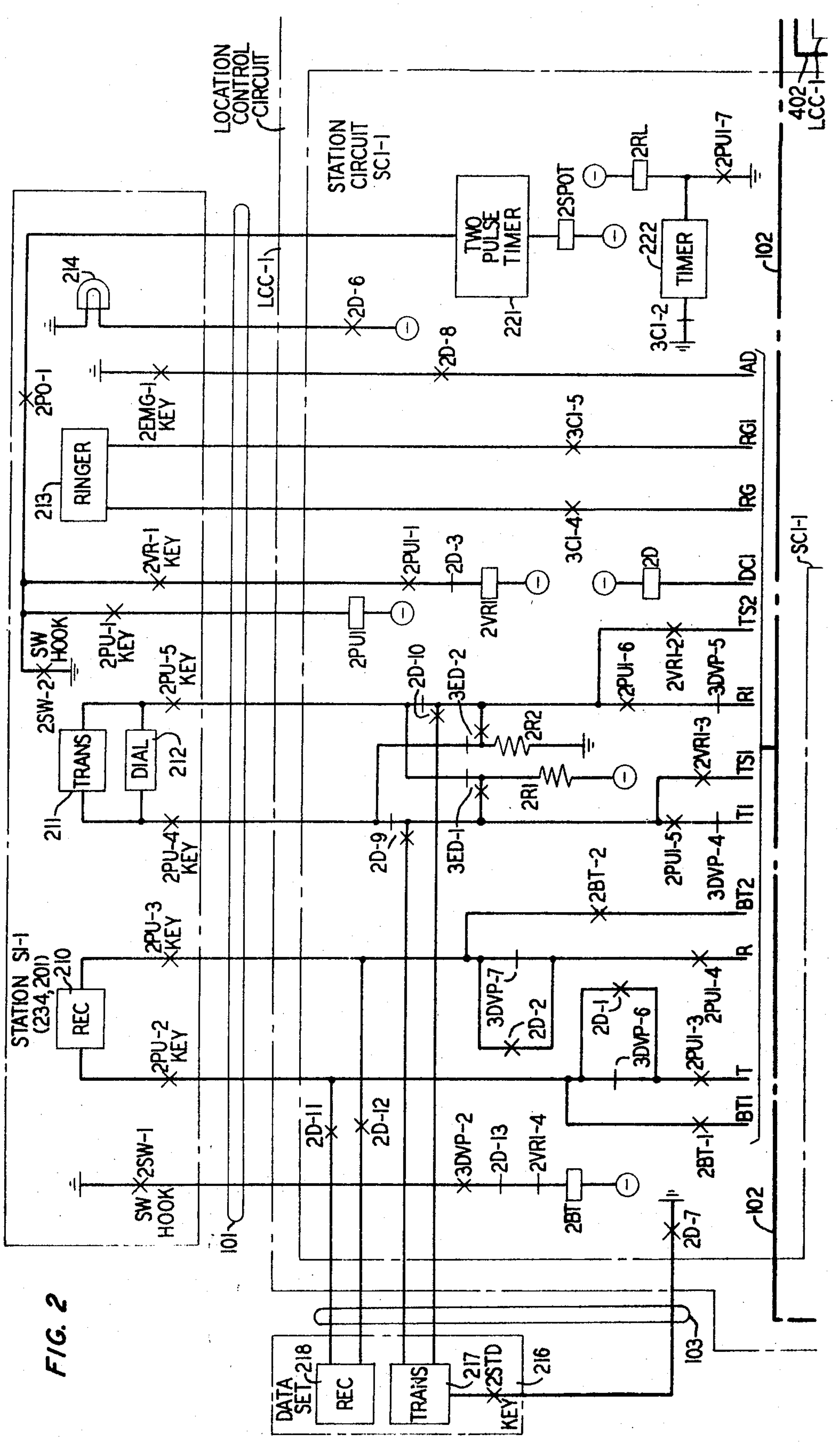
FIGS. 2 through 8 are schematic drawings showing in greater detail the interrelation of the components of the exemplary embodiment.

It will be noted also that in order to simplify the disclosure and thus facilitate a more complete understanding of the embodiment, the relays, relay contacts and other electromechanical devices shown in FIGS. 2 through 6 have been given systematic designations. Thus, the number preceding the letters of each device correspond to the figure in which the control circuit of the device is shown. Thus, the coil of relay 2D is shown in FIG. 2. Each relay contact, either make, break or transfer, is shown with its specific contact number preceded by the designation of the relay to which it belongs. For example, the notation 2PU1–1 indicates contact number 1 of relay 2PU1 the coil of which is shown in FIG. 2.

In order to further facilitate an understanding of the invention the description of the operation of the exemplary embodiment has been subdivided into a general description portion designated 1.00 and a detailed description designated 2.00.

Figure 9:
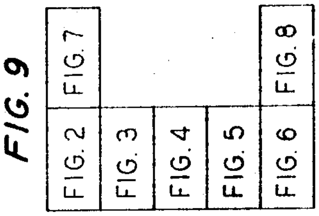
FIG. 9 shows the manner in which the other figures should be arranged.
Figure 1:
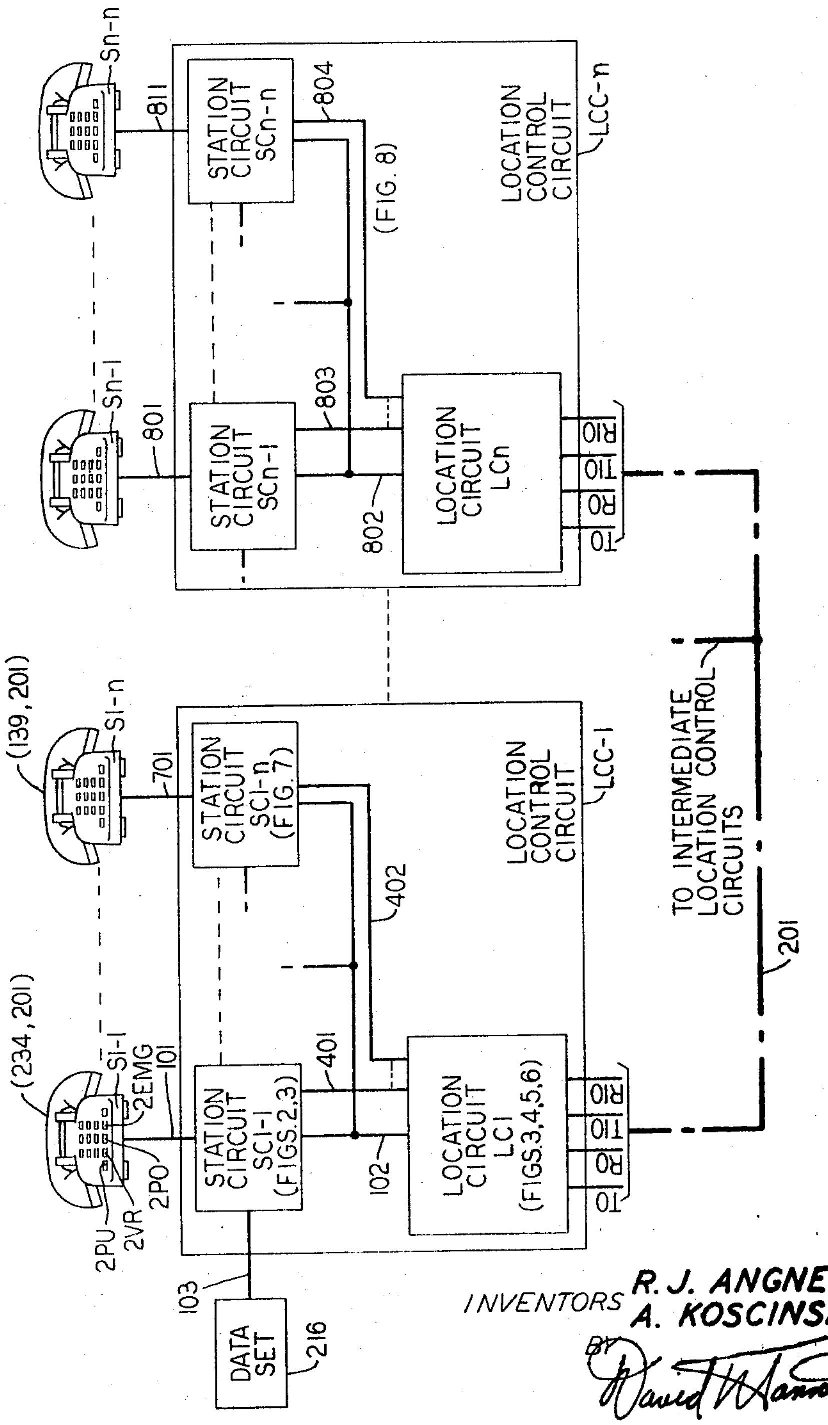
FIG. 1 is essentially a block diagram showing the interrelation of the exemplary embodiment of the invention.

Section 1.00 describes the invention in general terms with respect to FIG. 1 and Section 2.00 and its subsections described the invention in detail with respect to FIGS. 2 through 8.

1.00 General Description

Prior to beginning a discussion of the specific embodiment of this invention it may be helpful to review some of the fundamental aspects of private line selective signaling systems. Primarily, such systems may be characterized as huge party lines where a subscriber at any one of a number of stations, simply by removing the headset at that stations. In order that a calling party may communicate with a party at a certain selected station such systems are arranged with signaling capability of a selective nature. Thus although the stations all share a common communication path, each station is assigned a specific code for signaling purposes.

Turning now to FIG. 1, a four-wire transmission facility, such as four-wire path 201, is extended between a number of locations, each location connected directly across the respective leads of that facility. Each location is arranged with a location control circuit, such as location control circuit LCC–1, which circuit in turn controls communications involving any of the stations connected thereto. Each location control circuit includes a location circuit, such as location circuit LC1, common to all the stations served therefrom and individual station circuits, such as station circuit SC1–1 and SC1–*n*, individual to each such station.

Each location control circuit is located at a different point along the transmission facility and each such circuit is located central to the stations controlled therefrom. The station control circuits are usually located together with the corresponding location control circuit and connected to the respective stations via a cable such as cable 101 containing four communicating leads plus a number of signaling leads. Data transmission facilities, such as data set 216, may be located at any point accessible to the respective station control circuit and such facilities a re typically located in conjunction with a control station.

The four-wire transmission facility interconnecting the respective location control circuits, although shown as wire paths, may consist of any type of transmission media and in the typical situation where location control circuits are located at distant points the transmission facility may include microwave or any other transmission system or combination of systems. The transmission leads from the location control circuits are connected into the transmission path at various points along the way, usually at a central office. These connections are made via legs of a four-wire bridge in the well-known manner such that transmission over the transmit pair of leads from any location control circuit is received on the receive leads of all other location control circuits. Since the four-wire bridge is arranged to effectively prevent transmission feedback over the receive leads of a communicating line, provision has been made, as will be detailed hereinafter, to provide internal feedback in each location control circuit.

Each station served by the system may be assigned any number of three-digit codes and will respond to the reception of any of the codes. In addition, a number of stations may be assigned the same code and each will respond to the reception of that code. The group code at any station may be the only code assigned to that station, in which case that particular station will only ring when the group code is transmitted from a calling station; or the group code assigned to a station may be a second code or one of many codes assigned to that station, in which case the station will ring when any of the assigned codes is transmitted from a calling station.

2.00 Detailed Description

The following text will described the embodiment of the invention in detail with reference to FIGS. 2 through 8. For purposes of illustration let us assume that station S1–1 is assigned the individual code number 234 and the group code number 201. Also let us assume that station S1–*n* is assigned the individual code number "139" and is also assigned the group code "201." In the following description a typical call will be illustrated from station S1–1 which station will be designated an originating station to station S1–*n* which station will be designated a called station. Also it will be demonstrated that once a station is designated an originating station any other station going off-hook will have busy tone returned thereto and will be denied communication capability.

Figure 3:
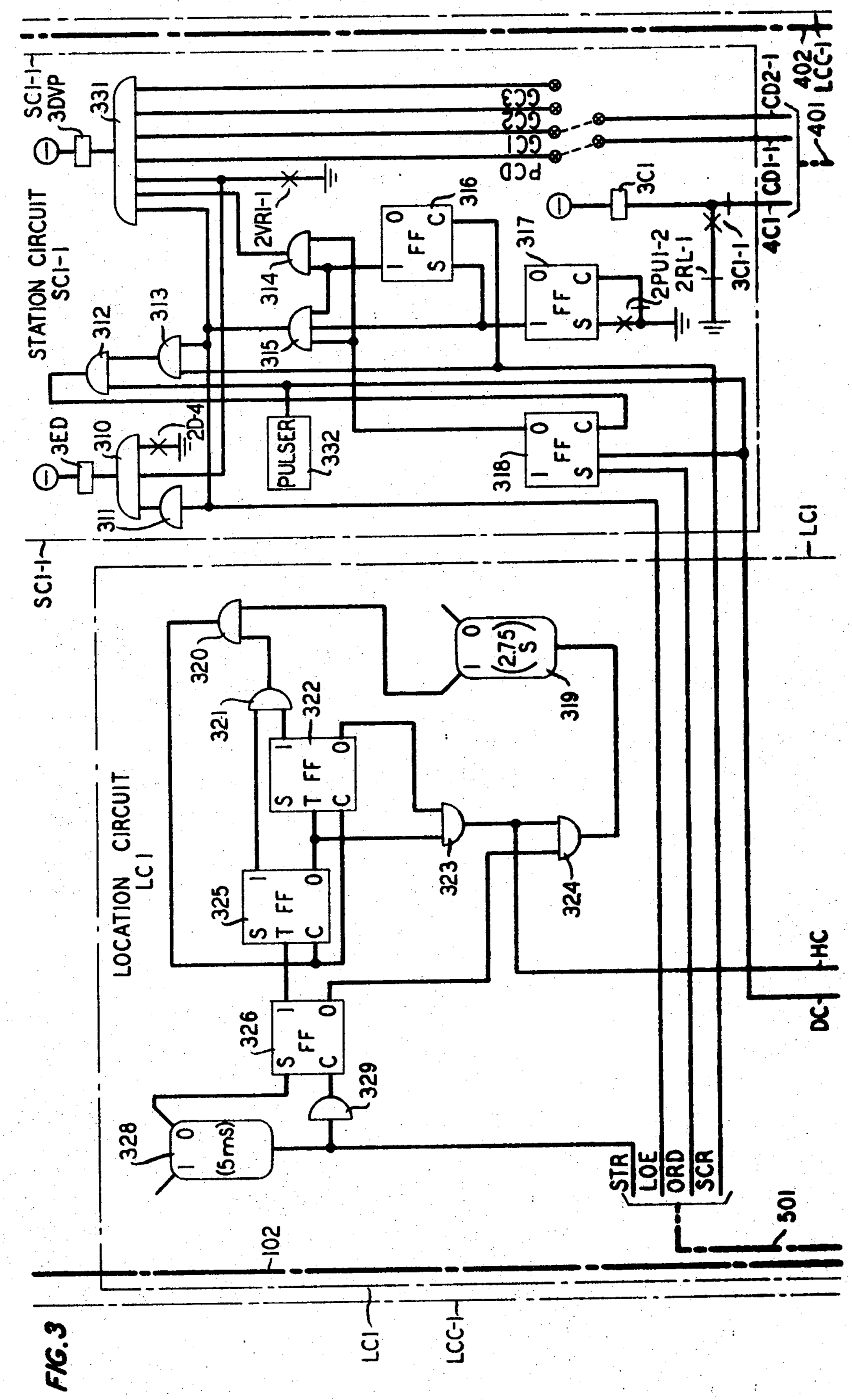

It should be noted that each electronic gate, such as gate 331, FIG. 3, is arranged in any one of the well-known circuit configurations such that when a battery potential (high) is present on all inputs, the gate will be turned on and the output of the gate will be ground (low). If any input is low, the gate will be turned off and the output will be high. Such a gate is known as a NAND gate. Unused inputs of all such gates will be assumed to be high. Gates having single inputs are used to perform a simple inversion thereby providing the inverse of the signal applied to the input. It should also be noted that in actual practice NAND gates, flip-flops, and many other electronic circuits are not designed to drive directly electromechanical devices or large numbers of gates. Therefore, it is customary for a circuit designer to choose the opposite output (such as "0" instead of "1" of a flip-flop) from the one desired and to use a power inverter gate to drive the necessary circuits. For purposes of clarity herein many of the inverter gates have been omitted and the flip-flops or other circuit elements have been shown to drive the output device directly. Those skilled in the art will not have difficulty selecting the proper components to perform the described function.

2.1 Initialization of Each Station

Figure 4:
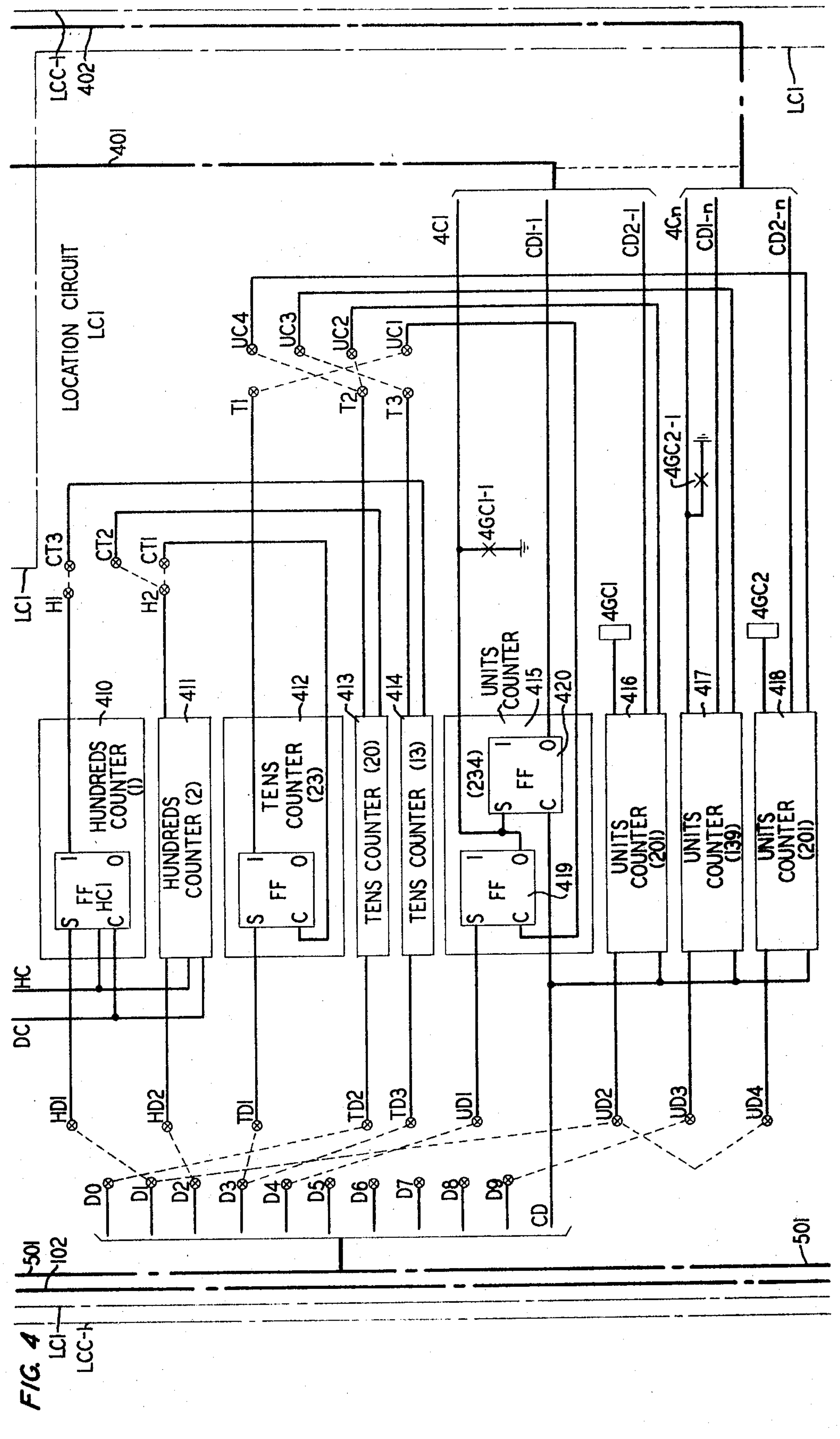

Turning now to FIG. 3, when power is turned on at any station, pulser 332, which pulser may be arranged in any one of the well-known circuit configurations operable to provide a low output for a certain time interval whenever potential is applied thereto, operates to set flip-flop 318 and also clears the hundreds counters 410 and 411 via lead DC to FIG. 4. The resulting low on the "0" output of flip-flop 318 causes the outputs of gates 314 and 315 to go high. Since, as will be demonstrated hereinafter, all of the other input leads to NAND-gate 331 are now high, the output of gate 331 goes low thereby operating relay 3DVP. The operation of relay 3DVP controls the extension of communication capability to the associated station, the importance of which will become much more apparent from that which is contained hereinafter.

Figure 5:
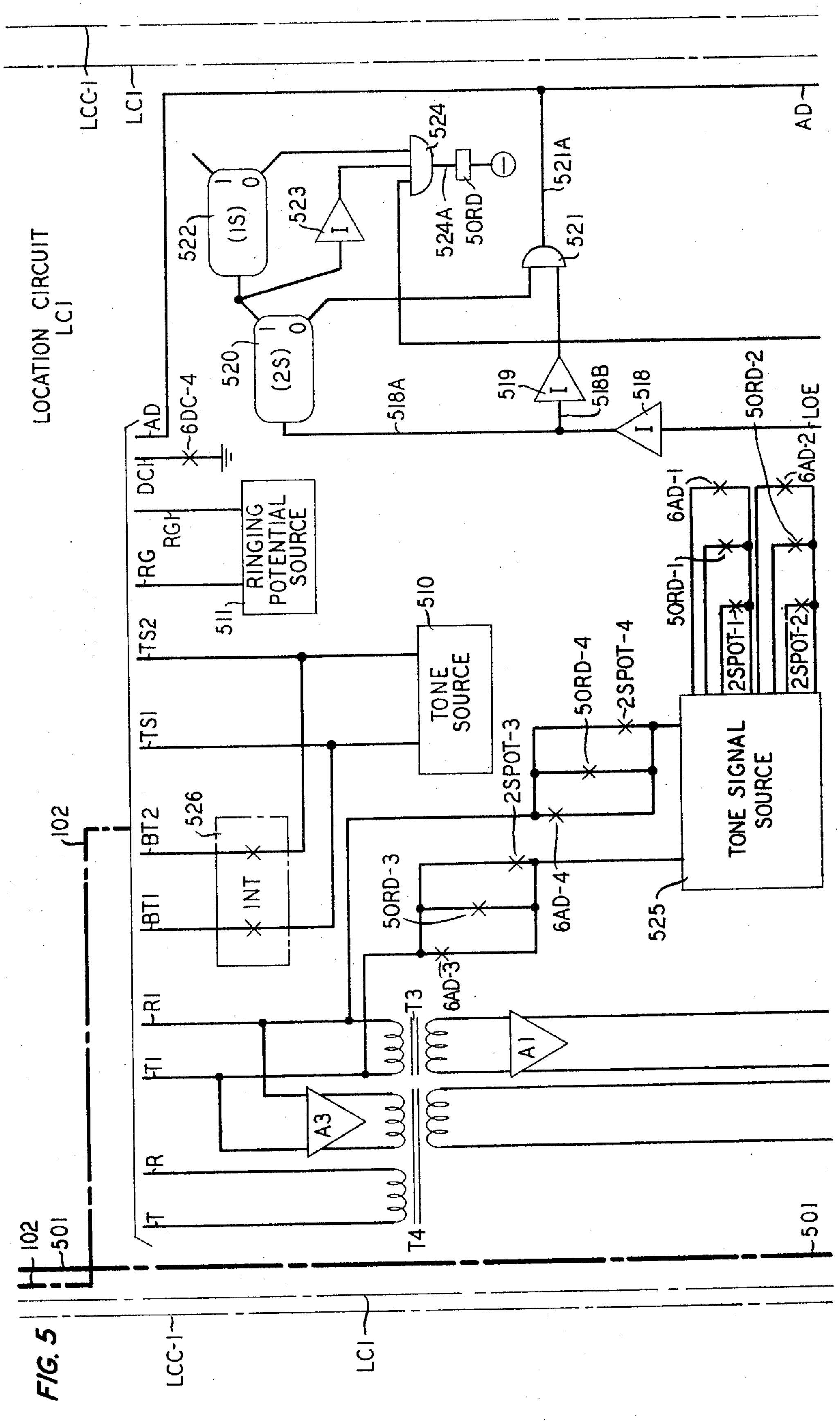

Digressing momentarily, the output of gate 315, which is high at this time, is extended over lead LOE of cable 501 to FIG. 5 and inverted by gate 518. The output leads 518A and 518B of gate 518 form input leads to a Step Input Responsive Output Timer consisting of timers 520 and 522 and gates 519, 521, 523, and 524. The manner in which the times 520 and 522 function is explained in detail in U.S. application, Ser. No. 779,512 of M. S. Lane. In general, when the voltage to the input of the timer makes a positive transition (low to high) both outputs of the timer immediately switch states with the "0" output switching from low to high and the "1" output switching from high to low. When the input returns from the high condition to assume a low condition, the resulting negative transition causes the timer to begin a variable timing interval during which interval the outputs remain unchanged. At the expiration of this delay interval the outputs make a voltage transition so that the "0" output switches from high to low and the "1" output switches from low to high. The value shown in parentheses inside each timer represents the delay interval of that timer.

The operation of the Step Input Responsive Timer is fully described in copending U.S. application, Ser. No. 14,451 of R. J. Angner. Leads 518A, 518B, 521A and 524A of the instant application correspond to leads 101, 102, 12, and 11, respectively, shown in FIG. 1 of the Angner application. Accordingly, since as discussed above, the input to gate 518 is high, leads 518A and 518B are both low and the "0" output of timer 520 is low while the "1" output is high. Thus at least one input lead of each of the NAND-gates 521 and 524 is low and the respective outputs are high, thereby maintaining relays 5ORD and 6AD released.

Returning now to FIG. 3, it should be noted that the purpose of pulser 332 is to initialize the corresponding station in a manner to prevent that station from interfering with a previously established conference merely by turning the power on and off at the station. Accordingly, since as will be seen from that which follows, gates 315 and 314 control the communication gates 331 and 310, no communication originating from that station may take place until flip-flop 318 becomes reset. Thus until a low pulse is present on lead SCR to gate 313, the communication capability of the corresponding station is inhibited.

As will be seen from that which follows, a low on lead SCR results only from receipt of disconnect (AD) tone, which tine is transmitted over the system under three conditions which conditions will be more fully detailed hereinafter. Accordingly, for purposes of illustration, let us now assume AD tone has been received and a low is momentarily present on lead SCR. This low resets flip-flop 318 via gates 313 and 312 and resets flip-flop 316 provided flip-flop 317 is set. Flip-flop 317 sets and resets in direct response to the off-hook and on-hook status conditions of the respective station set.

It is important to note at this point that in the event the associated station is off-hook, flip-flop 317 would be set and the "1" output would be high. Thus, when flip-flop 316 resets in response to the low on lead SCR, that flip-flop would remain reset, thus a low would be on the "1" output maintaining the output of gates 314 and 315 high. The importance of this arrangement is that a station which is off-hook prior to receipt of the system release signal will not become an originating station until the off-hook station first goes on-hook. In this manner no two stations can be originators at the same time, and also a permanently off-hook station cannot tie up the entire system without first becoming an on-hook station.

When the off-hook station goes on-hook, the 317 flip-flop resets, thereby setting flip-flop 316. The low from the "1" output of flip-flop 317 now maintains the output of gate 315 high while the output of gate 314 goes low due to high on the "0" output of flip-flop 318 and the high on the "1" output of flip-flop 316. The low output of gate 314 keeps the 3DVP relay released as long as the line is idle.

2.2 First Station Off-Hook

Assuming the system to be released with no stations off-hook, station S1–1, upon going off-hook, will be designated an originating station and the 5ORD relay will operate to transmit ORD tone throughout the system to prevent any other station from becoming an originating station.

Turning now to FIG. 2, upon removal of the switchhook and operation of the private line pickup key 2PU at station S1–1, ground is extended via enabled switchhook contact 2SW–2 and enabled line key contact 2PU–1 via cable 101 to operate relay 2PU1 in station circuit SC1–1 associated with station S1–1. Operation of the line pickup key also extends the transmission leads from the receiver 210 to the station circuit via enabled line key contacts 2PU–2 and 2PU–3. The transmission leads from transmitter 211 and dial 212 are also extended to the associated station circuit SC1–1 via now enabled line pickup key contacts 2PU–4 and 2PU–5 and cable 101. Since, as discussed above, relay 3DVP is operated, the dialing and communicating leads are not extended beyond the station circuit due to the enabled condition of break contacts 3DVP–6, 3DVP–7, 3DVP–4 and 3DVP–5.

Turning now to FIG. 3, flip-flop 317 becomes set, as discussed previously, from ground via enabled make contact 2PU1–2. Since flip-flop 318 is clear and flip-flop 316 is set, as discussed above, all input leads to gate 315 are high, thereby causing its output to become low. Thus, NAND-gate 331 remains off keeping relay 3DVP released. The low from the output of gate 315 is inverted by gate 311 and since all inputs to NAND-gate 310 are high, relay 3ED operates.

Figure 6:
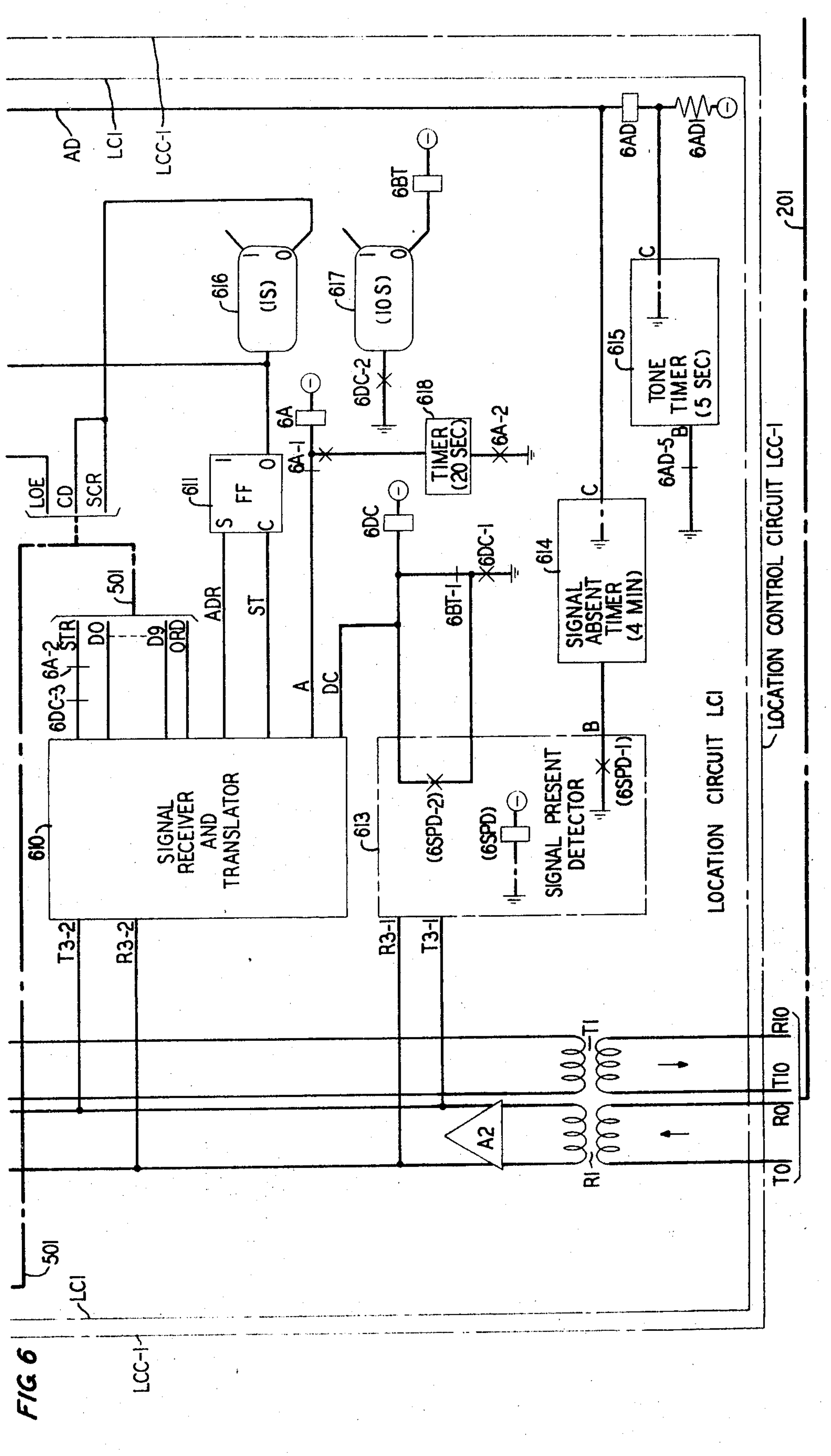

Returning now to FIG. 2, the transmit pair of the transmission path from station S1–1, which had been extended via cable 101 to circuit SC1–1, is now extended through released break contacts 2D–9 and 2D–10 and enabled make contacts 2PU1–5 and 2PU1–6 and now released break contacts 3DVP–4 and 3DVP–5 and the T1 and R1 leads of cable 102 to FIG. 5 and via transformer T3 and amplifier A1 to FIG. 6 and via transformer T1 to the transmit leads T10, R10 of the four-wire transmission facility.

Continuing in FIG. 6, the receive leads T0 and R0 of the four-wire transmission facility are now extended from the private line through transformer R1, amplifier A2 to FIG. 5 and via transformer T4 and leads T and R of cable 102 to FIG. 2 and through enabled make contacts 2PU1–3 and 2PU1–4 and now released break contacts 3DVP–6 and 3DVP–7 to the receiver 210 in station S1–1. Also, the operation of relay 3ED caused a battery and ground reversal between the transmit leads to dial 212 via now enabled transfer contacts 3ED–1 and 3ED–2. This reversal is in a direction to enable the key pulse dial 212 at station S1–1, which dial had been maintained in a disabled condition by the polarity applied by released transfer contacts 3ED–1 and 3ED–2. Accordingly, at this point the dial 212, the transmitter 211, the receiver 210 of station S1–1 are each enabled and dialing as well as two-way communication is now possible from station S1–1 to the four-wire private line facility interconnecting all of the stations via the respective location control circuits.

Continuing now in FIG. 3, when flip-flop 317 becomes set, the low provided by the output of gate 315 is extended via lead LOE and cable 501 to FIG. 5, and is inverted by gate 518 to a high. As discussed previously, the resulting low to high transition on lead 518A causes the outputs of timer 520 to make an immediate transition. Thus, the "0" output goes high and the "1" output goes low. The low output is inverted by gate 523 and applied to the input of gate 524. The resulting high to low transition is also applied to the input of timer 522 which timer begins a delay interval during which interval the "0" output remains high. Thus, all inputs to NAND-gate 524 are now high and relay 5ORD operates. After the delay interval of one second, the outputs of timer 522 switch and the "0" output becomes low thereby releasing relay 5ORD. Thus, relay 5ORD, upon station S1–1 going off-hook operates for a period of one second. This operation, as it will be seen, controls the transmission of ORD tone throughout the system.

Continuing now in FIG. 5, during the interval in which the 5ORD relay is operated, a specific tone which is designated ORD tone is generated by tone signal source 525 which source is arranged in any one of the well-known circuit configurations operable to provide different frequency tones at the output dependent upon the shorting out of certain tank circuits at the input. Accordingly, tone source 525 is controlled by enabled make contacts 5ORD–1 and 5ORD–2 so as to cause the generation of ORD tone. This tone is extended via enabled make contacts 5ORD–3 and 5ORD–4 and transformer T3 and amplifier A1 to FIG. 6 and via transformer T1 to the transmit pair of the four-wire private line. Thus, ORD tone is transmitted to all of the other location control circuits connected to the system. In addition, the ORD tone is transmitted via feedback amplifier A3, FIG. 5, and transformer T4 to the input of the signal receiver and translator 610, FIG. 6, serving the location from which the originating ORD tone is transmitted.

Continuing now in FIG. 6, ORD tone is received via leads T0 and R0 from all other location control circuits or via transformer T4, FIG. 5, if it had been transmitted from the same location. This tone is applied to the input leads T3–2 and R3–2 of receiver and translator circuit 610, which circuit is arranged in any one of the well-known circuit configurations operable to translate frequency tones into ground potentials on corresponding output leads. The translator is also operable to provide a ground on lead STR at the beginning of the signal transmission period. Accordingly, upon receipt of ORD tone, grounds are present on the STR and ORD leads, which grounds are extended via cable 501 to FIG. 3. The ground on the STR lead serves no function at this time.

Turning now to FIG. 3, ground on the ORD lead sets flip-flop 318 in all station circuits except the station circuit serving the station designated as the originating station, since the 318 flip-flop in that circuit is maintained in a reset condition by a low on the output of gate 312. Gate 312 is maintained in an on condition by highs on both inputs. The setting of flip-flop 318 will cause the 3DVP relay to operate at all stations (except the originating station) due to the high outputs on gates 314 and 315.

Summarizing briefly at this point, upon an off-hook condition of station S1–1, which station is designated an originating station, ORD tone is transmitted to all locations for a one-second timed interval. Upon detection of the ORD tone, a flip-flop is set in all station circuits except the station circuit serving the designated originating station. The purpose for setting this flip-flop will become more apparent from that which is contained hereinafter.

2.3 Second Station Off-hook

Assuming now that station S1–1 has been designated as the originating station. Accordingly, any other station in the system attempting to originate a call by going off-hook will be denied access to the private line. Instead, busy tone will be returned to the off-hook station. As an example, let us assume that a subscriber at station S1–*n* desires to originate a call. Accordingly, the switchhook and line pickup key at S1–*n* is operated.

Figure 7:
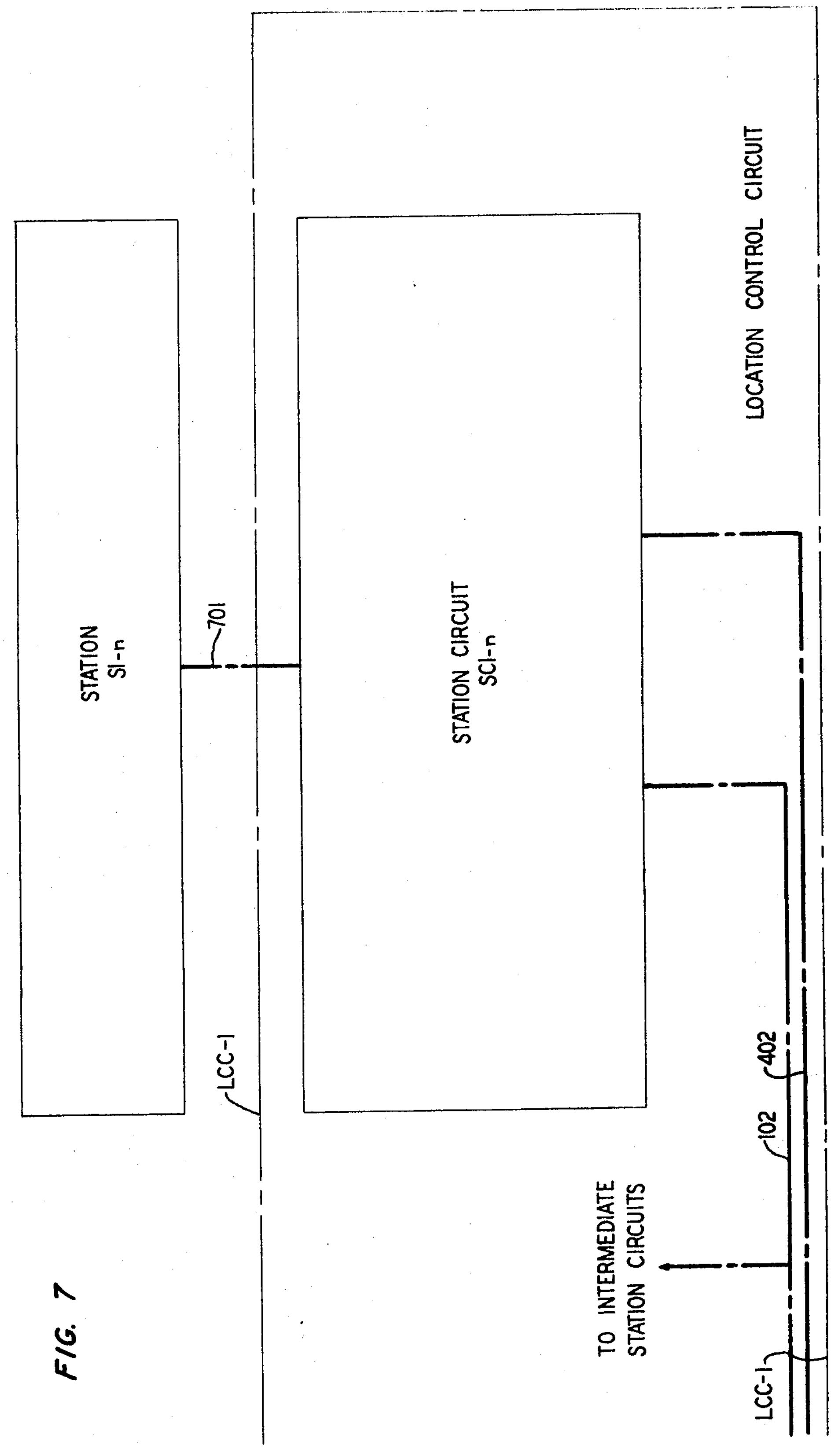
Figure 8:
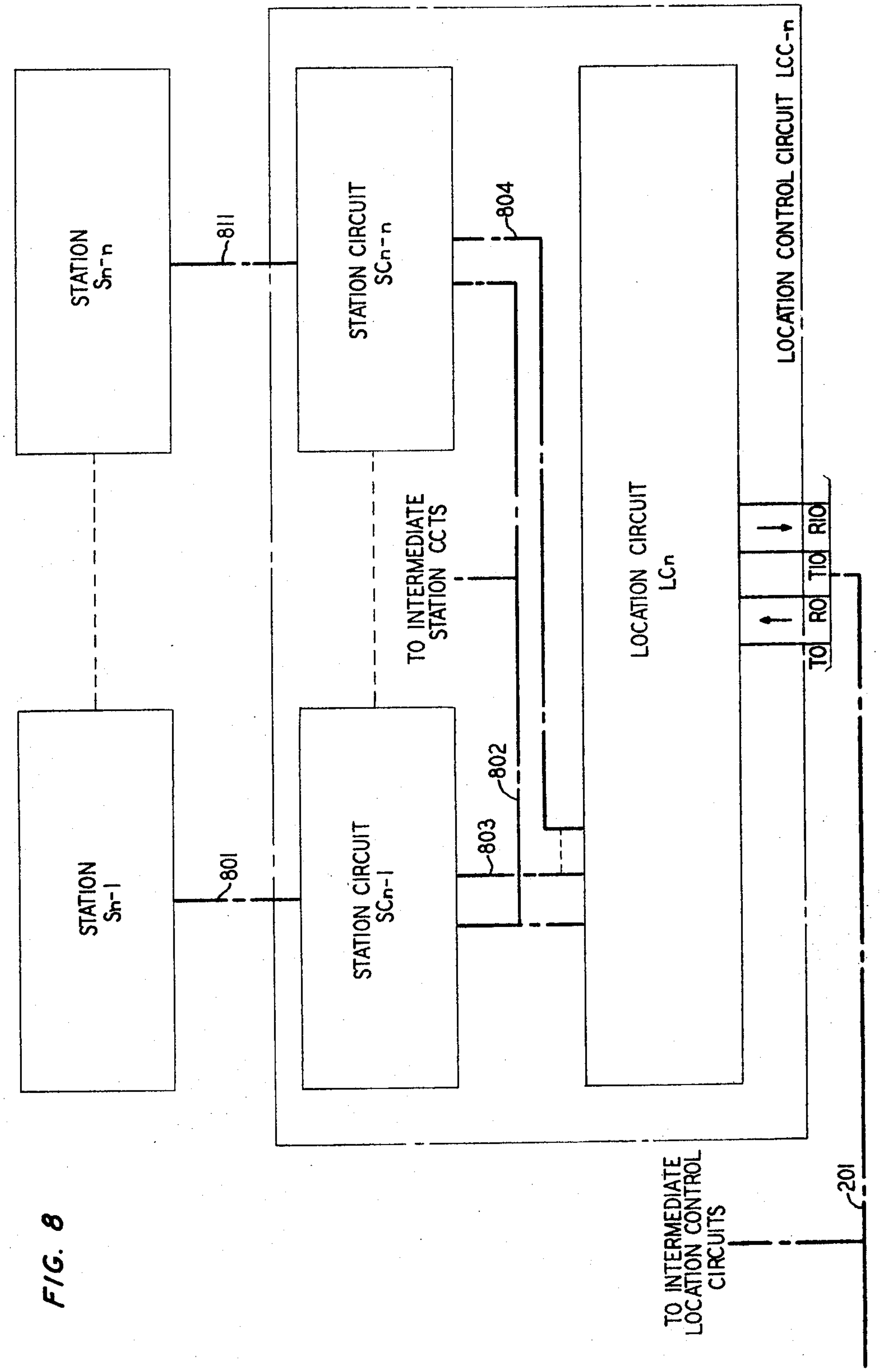

Turning now to FIG. 7, it will be seen that the circuitry of station S1–*n* and station circuit SC1–*n* have not been detailed since these circuits are identical with the circuits of the respective elements which have been fully detailed in FIGS. 2 and 3. Therefore, for purposes of clarity, the discussion of the circuit operation responsive to an off-hook condition at station S1–*n* will be given with respect to the circuitry detailed for station S1–1 in FIGS. 2 and 3 with the understanding that in actual practice individual circuits would perform these functions.

Accordingly, turning now to FIG. 2, upon an off-hook condition at station S–*n*, relay 2PU1 operates. The transmission leads from the receiver 210 and the transmitter 211 and dial 212 are extended to the station circuit in the manner previously described. However, because of the operated condition of the 3DVP relay associated with station S1–*n*, these leads are not connected to the private line facility at this time. In addition, it will be noted that since relay 3ED is normal, the battery and ground potentials provided to the dial 212 via transfer contacts 3ED–1 and 3ED–2 are not in the enabling direction and thus dial 212 of station S1–*n* is maintained inoperative at this time.

Turning now to FIG. 3, the enabling the relay 2PU1 sets flip-flop 317 as discussed above. However, since ORD tone has been received and a low placed on lead ORD, flip-flop 318 has been set. The low on the "0" output of flip-flop 318 maintains the output of gates 314 and 315 high regardless of the high now on the "1" output of flip-flop 317. Thus, gate 331 remains on and relay 3DVP remains operated. Also, since the output of gate 315 remains high, the output of gate 311 stays low, thereby maintaining relay 3ED normal.

Turning again to FIG. 2, since relay 3ED remains normal, dial 212 remains inoperative. And since relay 3DVP remains operated, the transmission leads from receiver 210 and transmitter 211 are not extended beyond the station circuit due to enabled break contacts 3DVP–6, 3DVP–7, 3DVP–4, and 3DVP–5. Thus the noncalled, nonoriginating station S1–*n* is denied access to the private line facility.

When the switchhook at station S1–*n* is operated, ground is extended via enabled switchhook contact 2SW–1 and cable 101 to the station circuit and via enabled make contact 3DVP–2 and released break contacts 2D–13 and 2VR1–14 to operate relay 2BT. Accordingly, the leads of receiver 210 are now connected via enabled make contacts 2BT–1 and 2BT–2 and leads BT1 and BT2 and cable 102 to FIG. 5 and via interrupter 526 to tone source 510. Tone source 510 is arranged in any one of the well-known circuit configurations operable to provide audible tones and which when coupled with interrupter 526 provide tones representative of busy tones over leads BT1 and BT2 to the receiver of the off-hook station. Accordingly, the subscriber at station S1–*n* receives audible busy tone representations upon attempting to initiate a call when another station has been designated an originating station. Communication to or from station S1–*n* is inhibited at this time.

2.4 Override Control

Assume now that the subscriber at station S1–*n*, upon receipt of busy tone, desires to use the transmission facilities on a priority basis. Accordingly, the override key 2VR at station S1–*n* is operated.

Turning again to FIG. 2, ground via enabled switchhook contact 2SW–2 and enabled override key contact 2VF–1 is extended via cable 101 to the associated station circuit and via enabled make contact 2PU1–1 and released break contact 2D–3 to operate relay 2VR1. Upon the operation of relay 2VR1, the transmit leads from the transmitter 211 of station S1–*n* are extended through enabled make contacts 2VF1–3 and 2VF1–2 and over leads TS1 and TS2 and cable 102 to FIG. 5 to tone source 510. Direct connection of these leads to tone source 510 provides a steady source of tone on the transmission line, the purpose of which will be more fully appreciated from that which is to follow.

Turning now to FIG. 3, the operation of relay 2VR1 provides a ground via enabled make contact 2VR1–1 to gate 331 thereby releasing relay 3DVP. Ground from enabled make contact 2VR1–1 is also extended to gate 310 thereby maintaining relay 3ED normal.

Returning again to FIG. 2, the transmission leads from transmitter 211 and from receiver 210 are now extended via released break contacts 3DVP–4, 3DVP–5, 3DVP–6 and 3DVP–7 and leads T1, R1, and T and R and cable 102 to FIG. 5 and via the transmission network to FIG. 6 to the respective transmission leads of the private line facility. Thus the subscriber at station S1–*n* may communicate with all stations connected to the private line network.

Continuing now in FIG. 2, dialing capability is denied station S1–*n* at this time since relay 3ED is maintained normal, as discussed above, and the battery and ground potentials necessary for enabling dial 212 remain reversed via released transfer contacts 3ED–1 and 3ED–2. Also, it will be noted that the tone which has been placed on leads TS1 and TS2 is now extended via enabled make contacts 2VR1–3 and 2VR1–2 to the transmission leads of the system. This tone serves as a warning tone to all subscribers presently communicating on the private line facility that a station is currently connected to the facility which station has not been designated an originating station, and which station has not been called by an originating station.

Upon operation of the override key at station S1–*n*, busy tone is removed from the line since relay 2BT releases upon the enabling of break contact 2VR1–4. Accordingly, an overriding subscriber at station S1–*n* may audibly communicate with any station on the line and may request that those stations go on-hook and relinquish the network for a priority call from station S1–*n*. Until such time as the private line network is released by the originating station going on-hook, communication other than that described above is denied station S1–*n*.

2.5 Establishment of a Connection Between Stations

Assuming now that station S1–1, which station previously was designated an originating station, desires to communicate with station S1–*n* which station, for purposes of illustration, we shall assume has returned to an on-hook condition. Accordingly, the subscriber at station S1–1 key pulses from enabled dial 212 at station S1–1 the three-digit code 139 associated with station S1–*n* which code is transmitted over the previously established transmission network to all location control circuits connected to the network.

Turning now to FIG. 2, the first digit (1) of the three-digit code is received via leads T3-2 and R3-2 of signal receiver and translator 610 in the manner previously described for ORD tone. Accordingly, a low is produced on lead STR and on lead D1. These lows are extended via cable 501 to FIGS. 3 and 4.

Turning now to FIG. 3, timers 328 and 319 and flip-flops 326, 325 and 322, together with the associated NAND-gates, form a digit counter and interdigital time circuit. This circuit operates in the following manner: when a first digit is received, signified by a low on lead STR, flip-flop 326 after a 5 ms. delay is set and sets flip-flop 325. Flip-flop 325 setting provides a low to gate 323 thereby driving lead HC high and opening the reset leads of the hundreds counters 410 and 411 of FIG. 4. At the end of the first digit, lead STR goes high thereby resetting flip-flop 326. Flip-flop 325 remains set at this time. Thus since both inputs to gate 324 are now high, the input to timer 319 goes low thereby starting an interdigital timing period of 2.75 seconds. If no other digit is received within this period, the "1" output of timer 319 goes high. Since at least one input of gate 321 must be low, both inputs to gate 320 are now high and flip-flop 325 is thus cleared. The high on lead DC is thereby removed and the counter resets.

In the situation where a second digit is received prior to the timeout interval, flip-flop 326 again is set, stopping the timing of delay gate 319. The second setting of flip-flop 326 causes flip-flop 325 to reset and the low to high transition of the "0" output of flip-flop 325 sets flip-flop 322. Thus a high remains on lead HC thereby maintaining the hundreds digit counter operable. At the end of the receipt of the code digit, delay gate 319 again provides interdigital timing. Upon receipt of the third and final digit, flip-flop 325 is set together with flip-flop 322. Thus both inputs to gate 321 are high thereby driving the output of gate 320 low so as to reset flip-flops 325 and 322. By this time, if the received code matches the station's code, in the manner to be discussed hereinafter, the units counter flip-flop will be set. At this time all counter flip-flops become reset when a low is transmitted on lead HC. This resetting results from the resetting of the flip-flops in the next preceding counter stage.

Continuing now in FIG. 4, the flip-flop circuits of each counter are arranged such that only when a certain cross-wired flip-flop has been operated prior to application of a low on a certain cross-wired input from the translator circuit will an output code relay, such as relay 3C1, operate. For example, in order to provide a low on lead 4C*n* to operate the code relay associated with station S1–*n*, the flip-flop in units counter 417 must set, or the flip-flop in units counter 418 (group code 210) must set. Since units counter 417 is prearranged for code 139, its clear lead will only be released if the two digits received prior to the third digit are 1 and 3 and are received in that order. This is accomplished by cross-connecting lead UC3 to lead T3 of tens counter 414. Since tens counter 414 is set for code 13, its clear lead will only be released if the digit received prior to the second digit is 1. This is accomplished by cross-connecting lead CT3 to lead H1 of hundreds counter 410. Thus only if the three digits 1, 3, 9 are received in the order "1," "3" and "9" will the flip-flops in units counter 417 set. The respective inputs to each circuit are cross-connected to the digit ground representing the digit for which that counter will respond. Thus lead D1 is cross-connected to lead HD1 of hundreds counter 410, which counter will respond to a first transmitted digit "1."

Accordingly, after the three-digit code "139" has been received, a first flip-flop (equivalent to flip-flop 419 of counter 415) in units counter 417 sets, thereby operating relay 4c*n* (not shown, but the equivalent of relay 3C1, FIG. 3). The flip-flop (equivalent to flip-flop 420 of counter 415) in units counter 417 is also set at this time and a low is transmitted over the CD1–*n* lead to the cross-connection field associated with the respective 331 gate, FIG. 3. Each such cross-connection terminal is associated with an input to gate 331, the first such input being designated the primary code (PCD) terminal and the other terminals being group code (GC-) terminals. Thus when an associated flip-flop, either the primary code flip-flop or a group code flip-flop, is set, a low is transmitted to an input of gate 331. The importance of the low on this input will become more apparent from that which comes hereinafter.

Turning again to FIG. 4, the second flip-flop, such as flip-flop 420 in units counter 415, once set will remain set for the duration of the connection and will only become reset upon receipt of a pulse on lead CD, which pulse will be generated by the location control circuit upon the receipt of AD tone in the manner to be discussed hereinafter. The first flip-flop in each counter, such as flip-flop 419 in units counter 415, upon becoming set will set the second flip-flop, as discussed above, and will operate the associated 3C- relay, also as discussed above.

It should also be noted that the controlling station may dial as many three-digit code numbers as desired, one immediately following the other, and thereby establish a conference connection among many stations. Also, once dialing is complete, the controlling station retains dialing capability and so may add other stations into the connection.

2.6 Connection of Called Station to the System

Turning again to FIG. 2, it will be recalled that when the digit decoder associated with the called station became enabled relay 3C1 operated. The 3C1 relay locked operated at that time through its own make contact 3C1–1 and released break contact 2RL–1. At the same time a low on the input lead of gate 331 caused the release of relay 3DVP.

Continuing in FIG. 2, upon the operation of relay 3C1, timer 222 begins a timing interval during which the 2RL relay remains normal. Ringing potential via leads RG and RG1 from ringing potential source 511, shown in FIG. 5, is extended via enabled make contacts 3C1–4 and 3C1–5 to operate ringer 213 in station S1–1. Accordingly, the subscriber at the called station is signaled in the customary manner via now enabled ringer 213.

Upon the subscriber at the called station removing the headset from the switchhook, the associated 2PU1 relay is operated. Accordingly, relay 2RL now operates via enabled make contact 2PU1–7 thereby releasing relay 3C1 via now enabled break contact 2RL–1 shown in FIG. 3. When the 3C1 relay releases, ringing potential is removed from the station via now released make contacts 3C1–4 and 3C1–5.

Digressing momentarily, it should be noted that if the called subscriber does not answer within the timed interval, timer 222 would release relay 2RL and the 3C1 relay would release, as above noted, and ringing potential would be removed from the station in that manner.

Returning again to FIG. 2, communication is now possible from the called station via transmitter 211 and cable 101 and through the associated station circuit and released break contacts 2D–9 and 2D–10, enabled make contacts 2PU1–5 and 2PU1–6 and released break contacts 3DVP–4 and 3DVP–5 to leads T1 and R1 of cable 102 to FIG. 5 and via transformer T3, amplifier A1 to FIG. 6 and via transformer T1 to leads T10 and R10 of the four-wire transmission facility. Communication from the four-wire transmission facility is extended to the called station via leads TO and RO of the facility and transformer R1, amplifier A2 to FIG. 5, transformer T4 and leads T and R of cable 102 to FIG. 2 and via enabled make contacts 2PU1–3 and 2PU1–4 and released break contacts 3DVP–6 and 3DVP–7 to the receiver 210 in the called station.

Digressing again momentarily, and turning to FIG. 5, it will be seen that transmission from the called station or from any station given communication capability is extended from the transmitter of the station over leads T1 and R1 and through transformer T3 to the transmit pair of the four-wire transmission facility. It will also be seen that a portion of this transmission is returned via amplifier A3 and a winding of transformer T4 back to the communicating station via leads T and R. This return transmission provides talk-back capability to the communicating station and also provides receive capability for all other stations served by the same location circuit. This arrangement for providing talk-back and local receiver capability is necessary since, as discussed previously, the four-wire bridge circuits which interconnect the four-wire transmission lines from each location provide relatively high return loss to the transmitting location.

Returning again to FIG. 3, upon the operation of relay 2PU1, flip-flop 317, which flip-flop it will be recalled detects the on-and-off-hook status of the associated station, becomes set. However, because of the set condition of flip-flop 318, which flip-flop was set upon receipt of originating ORD tone, the output of gate 315 remains high and relay 3ED remains normal. Thus, as shown in FIG. 2, although two-way communication capability has been extended to the called station, dialing capability is inhibited at this time because battery and ground potentials via resistors 2R1 and 2R2 maintain the station dial 212 in an inoperative condition via released break contacts 3ED–1 and 3ED–2.

2.7 Data Transmission relay

Assume now that the controlling station S1-1 desires to transmit or receive data to or from the stations currently connected to the four-wire private line facility. In such a situation, a special data code is transmitted by the controlling station. This code may be a three-digit code similar to the station code and, if so, would be translated in the manner described above for station codes with the exception that instead of operating a 3C- relay, the units counter would operate a special data relay, such as really 6DC. The code could be, as illustrated in the embodiment, a special tone generated directly by the station dial, such as is generated when the eleventh or twelfth key of a TOUCH-TONE type dial is operated.

Turning now to FIG. 6, upon generation of the data code by the calling subscriber and transmission of the code throughout the private line system via the four-wire transmission facility, the 6DC relay in all location control circuits becomes operated from a low on lead DC from the associated signal receiver and translator circuit 610 and locks operated to its own make contact 6DC–1 via released break contact 6BT–1. Upon operation of the 6DC relay, ground is extended via enabled make contact 6DC–4, FIG. 5 and lead DC1 and cable 102 to FIG. 2 to operate the 2D relay in every station circuit associated therewith. As will be seen from that which follows, relay 6DC and the associated 2D relays form a data control circuit for providing data communication between stations without interference from extraneous signals.

Returning now to FIG. 6, when the 6DC relay operates, the STR lead from signal receiver and translator 610 is opened via enabled break contact 6DC–3. Accordingly, since lead STR provides a low start signal for the decoding circuitry, that circuitry is inhibited from operation at this time under the control of the data relay. Thus, even if the data subsequently transmitted contained a series of numbers or frequencies similar to those contained in a station code, the decoding circuit would not respond and the data could thereby be protected from interference.

The enabling of relay 6DC provides a low start signal via enabled make contact 6DC–2 to timer 617. During the timing interval of timer 617, relay 6BT is maintained in a normal condition. At the expiration of the timing interval, relay 6BT operates thereby opening the previous lock path of relay 6DC via now enabled break contact 6BT–1. Accordingly, relay 6DC would release at this point if relay (6SPD) in signal present detector 613 has not operated. Signal present detector 613 is arranged in any one of the well-known circuit configurations to operate a relay such as relay (6SPD) whenever certain frequencies, such as voice frequencies or data frequencies, are present at the input transmission leads. Accordingly, as long as transmission is present, relay 6DC is maintained in an operated condition from ground via enabled make contact 6DC–1 and enabled make contact (6SPD-2). When data frequencies stop being transmitted, relay 6DC will release, thus removing the system from the data mode of operation.

Turning now to FIG. 2, operation of relay 2D cuts through a two-way transmission path from data set 216 via enabled make contacts 2D–11, 2D–12, 2D–9 and 2D–10. A ground start signal is also provided to data set 216 via enabled make contact 2D–7. The operation of relay 2D also connects the receiver 210 of the station and the receiver 218 of the data set to the receive leads T and R of the transmission facility via enabled make contacts 2D-1 and 2D-2. Thus the data which is received by data set 216 is also received by receiver 210 and accordingly any subscriber utilizing an off-hook headset will hear an audible indication that the network is being utilized for data.

In addition, the enabling of relay 2D provides negative potential via enabled make contact 2D-6 to operate lamp 214 in the station circuit as an indication that data is being transmitted throughout the network at this time.

Turning now to FIG. 3, relay 2D also provides a solid ground via enabled make contact 2D-4 to an input lead of gate 310 thereby maintaining relay 3ED normal. Since the 2D relay is operated in all station circuits, including the calling station circuit, the 3ED relay, which it will be recalled is operated only in the calling station, is released at this time. Accordingly, battery and ground potential via released break contacts 3ED–1 and 3ED–2, shown in FIG. 2, return the dial of the calling station to the inoperative condition.

2.8 Busy Tone Control During Data Mode

When the system is in the data mode and data is being transmitted over the four-wire transmission facility, busy tone will not be returned to a detected off-hook station. Instead, the receiver of that station will be connected across the receive leads of the transmission facility and the data itself will signify a busy condition.

Turning now to FIG. 2, when a noncalled station goes off-hook, the 2PU1 relay associated therewith operates. Since relay 2D in the associated station circuit is operated, relay 2BT cannot operate at this time due to the enabled condition of break contact 2D–13. Busy tone from leads BT1 and BT2 is not returned to the off-hook station due to the released condition of contacts 2BT–1 and 2BT–2. However, the receiver 210 of the off-hook station is connected to the receive leads of the transmission facility via enabled make contacts 2D–1 and 2D–2, enabled make contacts 2PU1–3, 2PU1–4 and the T and R leads, cable 102 and through FIG. 5 and 6 to the T0 and R0 leads of the facility.

It should be noted that the noncalled station cannot override the busy condition when the system is in the data mode since at this time relay 2VR1 is maintained normal via enabled break contact 2D–3. However, as an optional arrangement, provision may be made for a station to disconnect the entire system in an emergency situation operation of the 2EMG key. In such a situation, ground is extended via enabled make contact 2EMG–1 and enabled make contact 2D–8 and lead AD of cable 102 to FIG. 5 to operate relay 6AD in FIG. 6. The enabling of relay 6AD transmits disconnect tone throughout the system to disconnect all stations from the facility in a manner to be set forth hereinafter.

2.9 PBX Connections

When the originating station desires to establish a connection to a central office or PBX line, a special PBX code is transmitted over the facility from the originating station.

Turning now to FIG. 6, upon receipt of the PBX code at any location control circuit, the 6A relay therein operates and locks operated via its own make contact 6A–1 and through timer 618 to ground via enabled make contact 6A–2. Timer 618 is arranged to open the circuit after a preset time, typically 20 seconds. At the expiration of the timed interval, relay 6A will release. The purpose of this interval is to allow the controlling subscriber to dial the station digits of the PBX or central office station without at the same time calling a private line station which has the same combination of digits as its code number. This feature is accomplished by opening the STR LEAD, FIG. 6, via enabled break contact 6A–2 in the same manner as set forth above when the system is in the data mode.

2.10 System Disconnect

The system will be disconnected, that is, returned to a condition under which it is possible for the first station going off-hook to become a controlling station, whenever the 6AD relay is operated for more than one second. There are three situations which will cause the 6AD relay to operate—first, no transmission has taken place for a period of time, such as four minutes; second, when in the data mode, a subscriber operates the emergency key; and third, when the originating station goes onrhook.

In the first situation, as seen in FIG. 6, when signals are absent for four minutes the signal absent timer 614 responding to the released condition of relay (6SPD) in signal present detector 613 and places a ground on lead C to operate relay 6AD. Tone timer 615 controls the operation of the 6AD relay to prevent that relay from remaining operated greater than a certain period, typically five seconds. In the second situation, ground is provided in the manner set forth above from the enabled emergency key to operate 6AD relay.

The third method of operating the 6AD relay is somewhat more complex. Turning now to FIG. 3, when the controlling station goes on-hook, flip-flop 317 resets. The "1" output of flip-flop 317 goes low thereby causing the output of gate 315 to go high. Accordingly, the low previously on lead LOE is changed to a high. It will be remembered that lead LOE went low when the originating station first went off-hook and it was this low that caused the transmission of ORD tone throughout the system via timer circuit 522, FIG. 5.

Continuing in FIG. 5, when lead LOE returns high the input lead 518A to timer 520 makes a transition from high to low thereby starting a timed interval during which the "0" output remains high. Gate 519 inverts the low on lead 518B to a high and thus gate 521 turns on. Accordingly, a low is placed on lead 521A to operate relay 6AD, FIG. 6. After a two-second delay, gate 521 if turned off by the operation of timer 520. Thus upon a detected status change from off-hook to on-hook of the controlling station, the 6AD relay operates.

Continuing in FIG. 5, upon the operation of relay 6AD, tone signal source 525 is enabled via enabled make contacts 6AD–1 and 6AD–2 and disconnect tone is transmitted throughout the system via enabled make contacts 6AD–3 and 6AD–4 and transformers T3 and T4. Upon receipt of this tone, the ADR lead from signal receiver and translator 610 in each control circuit goes low while the ST lead goes high. Accordingly, flip-flop 611 becomes set and the input to timer 616 goes from high to low thereby starting a one-second timed interval. At the expiration of the timed interval, lead CD goes low thus clearing all units counter flip-flops, FIG. 5 via lead CD and cable 501. Also, lead SCR goes low thereby resetting flip-flops 316 and 318 in FIG. 3 in a manner previously described. The purpose of the one-second delay is to ensure the validity of the AD tone.

Continuing in FIG. 3, if a station is off-hook prior to the transmission of the AD tone, the 316 flip-flop which resets upon receipt of that tone, will remain reset due to the set condition of flip-flop 317. Thus, even though the associated station may be the only off-hook station, control capability is not extended thereto until that station first goes on-hook clearing flip-flop 317 and setting flip-flop 316. When flip-flop 317 sets upon the subsequent off-hook condition of the associated station, and such a station is the first station off-hook, the output of gate 315 goes low and the off-hook station is designated a controlling station and ORD tone is transmitted throughout the system to prevent any other station from also becoming an originating station.

Conclusion

While the equipment of the invention has been shown in a particular embodiment wherein a plurality of location control circuits have been arranged with equipment, such as frequency decoding equipment, common to many stations in a private line communication system, it is understood that such an embodiment is intended only to be illustrative of the present invention and numerous other arrangements may be devised by those skilled in the art without departing from the spirit and scope of the invention.

For example, the decoding and transmission control circuitry could be distributed for each station thus replacing the common location control circuit, as illustrated in the embodiment, with a separate control circuit for each station. Also it could be possible to substitute rotary dialing and pulse signaling for the frequency signaling illustrated. In addition, some or all of the stations could be replaced by computer terminals arranged to supply information to each other over a common transmission facility. Under these conditions, the connection between stations or computers could be initiated from one of the stations, or from one of the computer terminals.

What is claimed is:

1. A control circuit for establishing connections between selected stations in a private line communication system comprising means for detecting the on- and off-hook status of any one of said stations, means responsive to a detected off-hook condition of a first calling one of said stations for exclusively enabling signaling capability and bidirectional communication capability to said calling one of said stations, and means responsive to a detected off-hook condition of another one of said stations for extending busy signal representations to said other station.

2. The invention set forth in claim 1 wherein each of said stations is assigned a code number, means for detecting the signaling of the code numbers associated with called ones of said stations from said calling one of said stations, and means jointly responsive to the enabling of said code detecting means and to a detected off-hook condition of any of said called stations for enabling bidirectional communication between said off-hook called stations and said calling station.

3. The invention set forth in claim 2 wherein said stations are arranged into at least two groups, each group physically separated by a four-wire transmission facility, and wherein each group is controlled exclusively by an individual one of said control circuits.

4. The invention set forth in claim 2 wherein certain of said stations are equipped for priority signaling, and means in said control circuit operative in response to a priority signal from a station to which busy signal representations have been extended for inhibiting said representations and for enabling bidirectional communication from said priority signaling station to all stations to which bidirectional communication has been enabled.

5. The invention set forth in claim 2 further comprising means responsive to a detected on-hook condition of a station to which busy signal representations have been extended for releasing said extended representations, means responsive to a detected on-hook condition of any one of said called stations for releasing said extended bidirectional communication between said calling station and said detected on-hook called station, and means responsive to a detected on-hook condition of said calling station for releasing said enabled dialing capability of said calling station and for releasing said enabled bidirectional communication between all said called stations and said calling station so as to permit the extension of dialing capability and bidirectional communication capability to a next detected off-hook station.

6. The invention set forth in claim 2 further comprising means responsive to the transmission of a special signal from said calling station for releasing said enabled signaling capability and for inhibiting the extension of said busy signal representations to any detected off-hook station so as to establish bidirectional data communication capability between said calling and said called stations.

7. The invention set forth in claim 6 further comprising means for detecting the transmission of data between said calling and called stations, and means responsive to the absence of detected data for a certain interval for releasing said established data communication capability.

8. The invention set forth in claim 2 further comprising means responsive to the transmission of a special signal from said calling station for inhibiting the enabling of said code detecting means for a certain fixed interval so as to allow signaling by the calling station of a code number associated with a station located in a separate communication system without interference from stations within the private line system which have the same code number.

9. A private line communication system for selectively establishing communication connections among a number of stations over a transmission facility comprising a plurality of control circuits connected in parallel across said transmission facility, each said control circuit controlling communication connections to a group of stations, said control circuits each comprising means for detecting the on- and off-hook status of any of said stations served by said control circuit, means for determining the on- and off-hook status of all other stations served by the system, means jointly responsive to a detected off-hook condition of a calling one of said stations and to a determined on-hook condition of all other stations in the system for exclusively enabling signaling capability and bidirectional communication capability between said calling station and said transmission facility.

10. The invention set forth in claim 9 wherein said exclusively enabling means includes means for designating said calling station an originating station, and means for transmitting a first signal over the transmission facility when a calling station is designated as an originating station so as to enable said other station status determining means in each said control circuit.

11. The invention set forth in claim 10 wherein each of said stations is assigned a code number, means in each said control circuit for detecting the signaling of the code numbers associated with called ones of said stations from said calling one of said stations, and means responsive to the enabling of said code detecting means for enabling bidirectional communication between said called stations and said calling station.

12. The invention set forth in claim 9 wherein said control circuits further comprise means responsive to a detected off-hook condition of others of said stations while said status determining means is enabled for extending busy signal indications to said other detected off-hook stations.

13. The invention set forth in claim 12 wherein certain of said stations are equipped for priority signaling, and means in said control circuit operative in response to a priority signal from a station to which busy signal representations have been extended for inhibiting said representations and for enabling bidirectional communication from said priority signaling station to all stations to which bidirectional communication has been enabled.

14. The invention set forth in claim 12 further comprising means in said control circuit responsive to a detected on-hook condition of a station to which busy signal representations have been extended for releasing said extended representations, and means responsive to a detected on-hook condition of any of said called stations for releasing said extended bidirectional communication between said calling station and said detected on-hook called station.

15. The invention set forth in claim 12 further comprising means responsive to a detected on-hook condition of a said designated originating station for releasing said enabled bidirectional communication between all said called stations and said calling station and for transmitting a second signal over said transmission facility so as to release said other station status determining means in all said control circuits.

16. The invention set forth in claim 15 further comprising means for timing the absence of communication on said transmission facility, and means enabled by said timing means after a certain timed interval for transmitting said second signal so as to release said other station status determining means in said control circuit.

17. The invention set forth in claim 15 further comprising means for determining the relative order between a detected off-hook station and said transmission of said second signal, and means controlled by said last-mentioned determining means for inhibiting an off-hook station from being designated an originating station when said off-hook station was off-hook prior to said transmission of said second signal.

18. The invention set forth in claim 12 further comprising data control means operative in response to the transmission of a special code from said calling station, said data control means comprising means for inhibiting the extension of said busy signal representations to any said detected off-hook stations, and means for connecting the receive leads of all said detected off-hook stations to the receive leads of the transmission facility so as to allow the data stream to provide audible busy indications directly without interference from extraneous signals.

19. The invention set forth in claim 18 wherein said data control means further comprises means operable upon the enabling of said data control means for establishing a first timed interval, means operable upon the detection of data communications over said facility for inhibiting said timed interval, and means responsive to a completion of said timed interval for releasing said data control means.

20. The invention set forth in claim 19 further comprising means responsive to the enabling of said inhibiting means and to a subsequent absence of said data communication over said transmission facility for releasing said data control means.

21. The invention set forth in claim 18 wherein certain of said stations are equipped for priority signaling, and means in said control circuit operative in response to a priority signal from the station to which busy signal representations have been extended for inhibiting said representations and for enabling bidirectional communication from said priority signaling station to all stations to which bidirectional communication has been enabled.

22. The invention set forth in claim 21 wherein said data control means further comprises means for inhibiting said priority signals from said stations while said data control means is enabled.

23. The invention set forth in claim 22 wherein said data control means further comprises means for extending to any station capability for enabling said second signal transmission means when said data control means is enabled.

24. The invention set forth in claim 13 wherein said priority station communication enabling means further includes means for transmitting a special tone over said transmission facility as a warning that a priority station has been given communication capability.

* * * * *